(12) United States Patent
BenBassat et al.

(10) Patent No.: US 8,798,779 B2
(45) Date of Patent: Aug. 5, 2014

(54) MULTI-DIMENSIONAL RESOURCE OPTIMIZATION IN THE MANUFACTURE OF SUBSTANTIALLY TWO-DIMENSIONAL ELEMENTS

(75) Inventors: Moshe BenBassat, Zur Moshe (IL); Eduard Goldner, Tel Aviv (IL); Avner Ben-Bassat, Tel Aviv (IL); Eyal Flato, Tel Aviv (IL); Moriah Royz, Tel Aviv (IL)

(73) Assignee: Plataine Ltd., Tel Aviv (IL)

( * ) Notice: Subject to any disclaimer, the term of this patent is extended or adjusted under 35 U.S.C. 154(b) by 953 days.

(21) Appl. No.: 12/891,830

(22) Filed: Sep. 28, 2010

(65) Prior Publication Data

US 2012/0078405 A1    Mar. 29, 2012

(51) Int. Cl.
*G06F 19/00* (2011.01)
*G06F 17/00* (2006.01)
*G06Q 10/06* (2012.01)

(52) U.S. Cl.
CPC ..................................... *G06Q 10/06* (2013.01)
USPC ................. 700/100; 700/90; 700/95; 700/97; 700/99

(58) Field of Classification Search
USPC .................. 700/90, 95, 97, 99, 100
See application file for complete search history.

(56) References Cited

U.S. PATENT DOCUMENTS

| 5,703,781 | A | 12/1997 | Martell et al. |
| 5,920,480 | A * | 7/1999 | Nakamura et al. ............ 700/114 |
| 6,470,228 | B1 | 10/2002 | Turner et al. |
| 6,560,499 | B1 * | 5/2003 | Demmer ......................... 700/97 |
| 6,675,059 | B2 | 1/2004 | Scott |
| 6,785,581 | B2 | 8/2004 | Mountcastle, III et al. |
| 7,076,323 | B2 * | 7/2006 | Vanderwiel ................... 700/182 |
| 2007/0260345 | A1 * | 11/2007 | Mifsud et al. ................... 700/97 |

* cited by examiner

*Primary Examiner* — Mohammad Ali
*Assistant Examiner* — Ziaul Karim
(74) *Attorney, Agent, or Firm* — Naomi Assia Law Offices

(57) ABSTRACT

The present invention enables the efficient use of resources in the manufacture of substantially two-dimensional elements through multi-dimensional resource optimization subject to rules and objectives. The invention may be embodied as a computer-based method, a computerized system that performs the method, or a machine readable storage medium containing instructions that when executed cause performance of the method using the computerized system. To fulfill customer orders, product design data, resource data, and rules and objective data are accessed to determine the efficient use of the resources, such as consumption of particular units of raw material and utilization of production stations. For a given set of customer orders, multiple scenarios of production plans are computed and recomputed until an efficient production plan is achieved. The production plan can be generated at a location remote from the manufacturing site, and it can then be sent in an automated fashion to the production stations.

30 Claims, 5 Drawing Sheets

| Job | Material | Due Date |
|-----|----------|----------|
| A | X | +1 day |
| B | X | +2 days |
| C | X | +3 days |
| D | Y | +2 days |
| E | Y | +9 days |
| F | Z | +1 day |
| G | Z | +3 days |
FIG. 5a
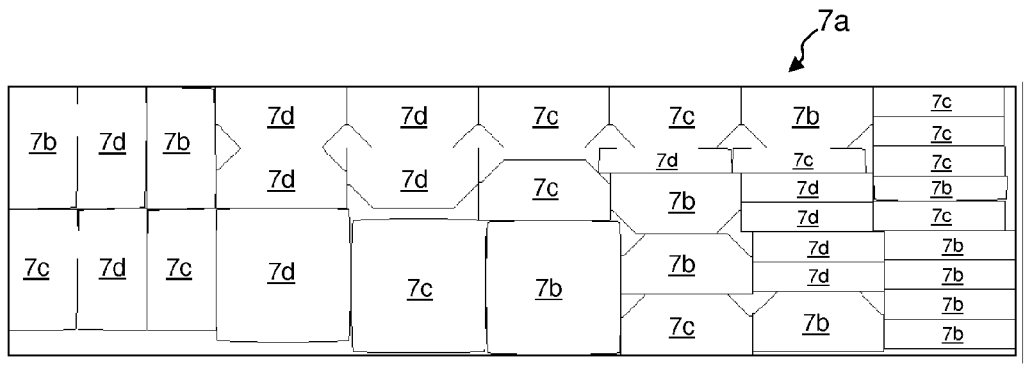
FIG. 5b
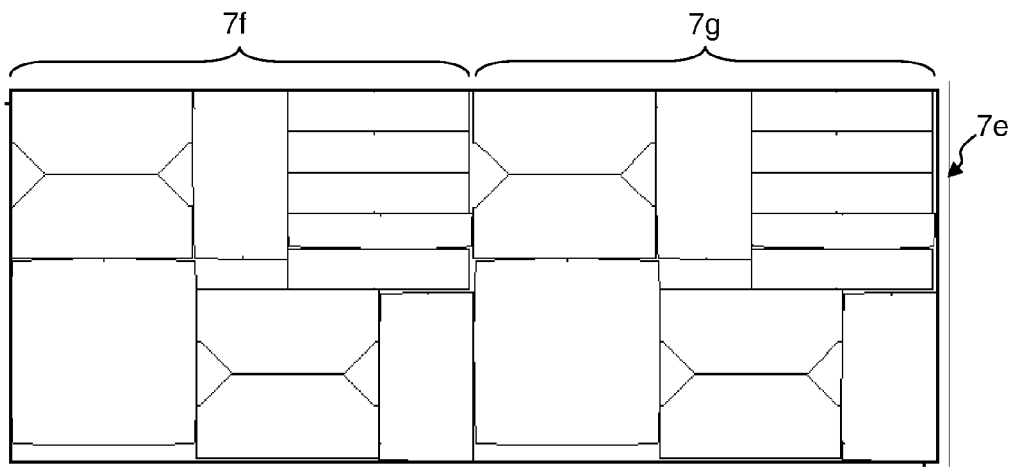
FIG. 5c

MULTI-DIMENSIONAL RESOURCE OPTIMIZATION IN THE MANUFACTURE OF SUBSTANTIALLY TWO-DIMENSIONAL ELEMENTS

BACKGROUND

Businesses seeking to optimize yield from resources constantly balance competing factors in an attempt to increase the efficiency of production. The present disclosure focuses on the environment of a manufacturing plant producing substantially two-dimensional elements for a greater product, for example, individual fabric pieces for a garment, wood and fabric panels for an item of furniture, or metal parts for automobile parts or components of an aeronautical vehicle body made of composite material. (The term "substantially" is used, because naturally some of the components, like exterior panels of aircraft, will be curved, bowed, or otherwise shaped away from a plane.) The resources involved include—among others—raw materials, machinery to process the raw material, and machinists to operate the machinery. A busy production manager may need to make numerous "business decisions" every day regarding what appears at any given moment to be the best balance of resource use given production goals and constraints.

Consider a simplified example in which a nest of metal panels is to be created for a vehicle, and the machine to cut the panels and the machinist to operate the machine are assumed to be available. The term "nest" in this context refers to an arrangement of the panels to be cut from the raw material, and the term 'nesting' refers to the action of preparing a nest. An example nest 1 is illustrated in FIG. 1. In some industries, the synonym "marker" is commonly used in place of "nest."

As shown in FIG. 1, the outlines of the individual panels, such as outlines 2, are oriented on a graphical representation 3 of a sheet of material to indicate how to cut the panels to provide highly efficient use of the raw material. There are many conventional manual and software-based methods and tools used for nesting. The algorithms available for this purpose use as input the length and the width of a sheet or roll of material, additional data that indicate the sizes and shapes of the individual panels, and various rules as to what is allowed or not allowed in terms of placing the various panels on the raw material, such as panel-tilting and gap restrictions. Despite the sophistication of present-day nesting algorithms, though, less than optimal material use is still an issue. Note in FIG. 1 the large area 4 in the sheet that is not used.

The human production manager (or other person in such position) must make decisions regarding the optimization of other factors that are not included in a "nesting-only" determination. For example, if the production manager receiving the order for metal panels anticipates receiving at least three additional identical orders in the near future, he/she may decide to conserve both the human resources and the hardware and software resources for computing multiple new nests by reusing the same nest for each of the four orders as represented in FIG. 2. However, the reduced usage of the resources for designing the nests needs to be balanced against the increased usage of other resources, such as that of the raw materials. With reference again to FIG. 2, it is clear that the unused portion of raw material (areas 4) quadruples when four orders are processed instead of one, when using the same single-unit nest four times.

If instead the production manager decides to combine ("merge") the four orders ("jobs") of FIG. 2 into a single nest (denoted "single" despite the fact that multiple individual sheets are used), savings in raw material use would be expected. In this example, with reference to FIG. 3, a nest 5a, 5b, and 5c for the combined four orders (known also as the nest for the "merged job") uses only three sheets of material, as opposed to four sheets, so the savings in material is clear.

Lacking an efficient method or system for weighing such a decision, it is common practice today for manufacturers to develop and store a single unit nest (or a nest for any pre-defined quantity) for each product or kit of parts, as in FIG. 1. Then, when the need to make this product or kit of parts arises, the nest and cutting programs are readily available, and the stored nest is retrieved and reused as many times as the product unit was ordered. Thus, in the interest of saving resources needed to redesign a nest for the exact quantity of units required, raw material is wasted by repeating the waste inherent to the single-unit nest.

There are many other considerations a production manager must make regularly when developing a production plan. For example, consider a scenario in which sheets or rolls of raw material exist in inventory, and these sheets/rolls have sizes that differ from that assumed for the predetermined nest. Such sheets or rolls could be remnants from a previous production order, and even unused sheets/rolls in an inventory can vary somewhat in dimensions. Different-sized raw materials often require different nests, because the optimal arrangement of parts may vary according to the dimensions of the raw material. Moreover, in the course of operations at a typical facility, the manufacturing processes continually consume raw material, so the stock of inventory varies by the hour, causing continual changes in the amount of "standard"-sized material and the amount and dimensions of the remnants of what was once standard-sized material pieces. It is desirable to use the material remnants when possible, as opposed to discarding (wasting) them, but then resources (human resources, time, etc.) are necessary to determine the best way to redesign the new nests for the specific dimensions of each of the remnants. Thus, in this simplified example, the final selected nest(s) is the end result of a complicated process involving two (at least) categories of variable inputs, that of the jobs and that of the available raw materials in inventory. The job data indicate the numbers and dimensions of the elements to cut, and the available raw material data indicate the quantities, sizes, and shapes of raw materials, both of the "standard" size sheets/rolls and that of the remnants of the raw materials.

Consider now two solutions to a production requirement that pairs a single job (requiring a specified number of elements of given dimensions) to two different sets of raw materials, the first set being a single unused unit (e.g., a sheet or roll) of raw material and the second set using two separate remnants (two units) of raw materials from previous jobs. The solution using the single unit is faster to cut, because the cutting machine needs to be loaded only once. Typically, though, a remnant of the sheet/roll will remain unused, and this will add to overall waste if the remnant is discarded or to costly inventory-holding expenses (so the remnant may be used for a future job). In contrast, the solution using two remnants reduces inventory-holding expenses but requires more time and human resource because two units are cut and two nests are computed.

In reality, there are far more than two production solutions to compare, and the determination of them (or any other options) is a time and resource consuming process. Therefore, in the absence of a fast automated process, production managers either limit the number of options they consider (and often do not consider more than one), and this typically causes underutilization of resources because of the lack of awareness of better undetermined options. This is the inevitable result of the lack of time, tools and resources to consider all options.

Scheduling and labor costs are also important considerations for running a manufacturing plant. For example, if human resources costs increase significantly when employees work overtime, a production manager may be motivated to avoid scheduling work at non-standard working hours. However, dividing a job over additional days may require more machine down-time because of the repeated setup periods, and that additional expense that would not exist if the job were completed in a single cutting session.

The present inventors realized that the considerations that a production manager must make are numerous and that the choices of the best trade-offs are often made based on experience and "gut instinct." Also, many of the trade-offs are often not made by high-level production managers, but instead by low-level manufacturing personnel, because the shear number of decisions are too numerous for senior management to address personally. Thus, many decisions cannot be made with the "big picture" in mind, and the results can have very costly consequences Implementing a variation of the integrated multi-dimensional optimization described below in the present disclosure as a manual solution would have been prohibitive, due to the extensive calculations needed. Accordingly, the present inventors set out to develop a mechanism to automate and to optimize much of the decision making that previously was made in large part based on "educated guesses." This mechanism would enable consistent and centralized decision making according to policies set by management.

Software solutions that implement certain steps, or certain facets, of the business processes described below fall under the broad categories of Business software products (for example, Enterprise Resource Planning (ERP)) or Engineering software products (for example, CAD/CAM). The lowest level entities managed by business software are typically customer orders for complete products or kits. There is marginal, if any, representation of the geometric shape of the individual pieces that comprise the product or the kit. (Such is analogous to a consumer who comes to a store to order a sofa; he does not communicate in terms of the sofa's frame, handle, or back. The atomic unit is a complete sofa, although there are many choices of complete sofas in a variety of combinations.) On the other hand, CAD/CAM software rarely deals with specific customer orders. Instead, it deals with generic products, for example, "Sofa Model 101" from a library of products offered by the business and the full details of the parts that make these products, including their geometric shape, the raw material from which they need to be cut, the characteristics of the machines on which they may be cut, and so on.

Thus, there remained an unmet need for a higher level of production resource optimization by bridging the gap between software solutions from the Business category (e.g., ERP) and software solutions from the Engineering (e.g. CAD/CAM) category and their related processes and entities.

SUMMARY

The present invention meets the previously-unmet need discussed above. Embodiments of the invention achieve a higher level of optimization of production resource use by bridging the gap between software solutions from the Business and Engineering categories. The unique optimization approach combines factors such as due dates of products for customers, a concern addressed by Business software, with factors addressed by Engineering software, such as nesting the geometric shapes of pieces of specific products and the raw material from which they are to be cut. Moreover, research conducted by the present inventors based on extensive real life case studies proves that the optimization achieved by the present invention leads to better end results compared with the optimization results of solutions that solve various issues in isolation, such as software or methods that perform nesting-only processes.

The present invention enables the automated optimization of resource use in the manufacture of substantially two-dimensional elements, by producing a production plan that concurrently accounts for the range of available resources and makes optimal use of them based on the manufacturers' goals and constraints. As the decision making is automated, many alternative resource allocations and their consumption may be considered to find a highly efficient solution. The invention may be embodied as a method, as a system, and as a storage medium containing instructions.

Regarding the method, the invention may be embodied as a computer-based method of combining customer order information with information about available resources and about product design to produce an efficient production plan for manufacturing substantially two-dimensional elements. The method includes: maintaining manufacturing data in a memory, the data including job data, product design data, resource data, and rule and objective data; computing, based on the product design data, the resource data, and the rule and objective data, production orders for substantially two-dimensional elements for selected jobs associated with the job data, whereby a production order specifies for at least one given job one or more nests and resources to cut the one or more nests; computing, based on the product design data, the resource data, and the rule and objective data, a production plan for the production orders, whereby the production plan schedules execution of the production orders; determining, based on the resource data, whether the computed production plan requires more resources than are available; and modifying the rule and objective data maintained in the memory and repeating the preceding steps, if more resources than available are determined to be required.

The invention may also be embodied as a computerized system for combining customer order information with information about available resources and about product design to produce an efficient production plan for manufacturing substantially two-dimensional elements. The system has an input interface, a processing unit, a storage unit, and an output interface. The input interface is configured to receive manufacturing data that include job data, product design data, resource data, and rule and objective data. The processing unit operatively connected to the input interface. The storage unit is operatively connected to the processing unit to store the manufacturing data. The storage unit also contains instructions that when executed by the processing unit cause the processing unit to: (1) compute, based on the product design data, the resource data, and the rule and objective data, production orders for substantially two-dimensional elements for selected jobs associated with the job data, whereby a production order specifies for at least one given job one or more nests and resources to cut the one or more nests; (2) compute, based on the product design data, resource data and the rule and objective data, a production plan for the production orders, whereby the production plan schedules execution of the production orders; (3) determine, based on the resource data, whether the computed production plan requires more resources than are available; and (4) modify the rule and objective data maintained in the storage unit and repeat the preceding instructions, if more resources than available are determined to be required. The output interface is operatively connected to the processing unit and is configured to transmit signals indicative of the computed production plan.

The invention may further be embodied as a computerized system having an input interface means, a means for processing, a means for storing, and an output interface means. The input interface means is for receiving signals that indicate manufacturing data that include job data, product design data, resource data, and rule and objective data. The means for processing is operatively connected to the input interface means. The means for storing is for storing the manufacturing data and instructions. The instructions when executed by the processing means cause the processing means to: (1) compute, based on the product design data, the resource data, and the rule and objective data, production orders for substantially two-dimensional elements for selected jobs associated with the job data, whereby a production order specifies for at least one given job one or more nests and resources to cut the one or more nests; (2) compute, based on the product design data, the resource data, and the rule and objective data, a production plan for the production orders, whereby the production plan schedules execution of the production orders; (3) determine, based on the resource data, whether the computed production plan requires more resources than are available; and (4) modify the rule and objective data maintained in the means for storing and repeat the preceding instructions, if more resources than available are determined to be required. The output interface means is for transmitting signals that indicate the computed production plan.

The invention may additionally be embodied as a machine readable storage medium containing instructions associated with combining customer order information with information about available resources and about product design to produce an efficient production plan for manufacturing substantially two-dimensional elements. The instructions when executed cause the following: maintaining manufacturing data in a memory, the data including job data, product design data, resource data, and rule and objective data; computing, based on the product design data, the resource data, and the rule and objective data, production orders for substantially two-dimensional elements for selected jobs associated with the job data, whereby a production order specifies for at least one given job one or more nests and resources to cut the one or more nests; computing, based on the product design data, the resource data, and the rule and objective data, a production plan for the production orders, whereby the production plan schedules execution of the production order; determining, based on the resource data, whether the computed production plan requires more resources than are available; and modifying the rule and objective data maintained in the memory and repeating the preceding instructions, if more resources than available are determined to be required.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

FIG. 5a provides a table used in conjunction with text below to describe an example scenario for performing the method associated with FIG. 4;

FIG. 5b illustrates a single nest having the elements of three separate jobs mixed together;

FIG. 5c illustrates a rolling nest having the elements for separate jobs nested separately on a single sheet of material;

DETAILED DESCRIPTION

The invention summarized above and defined by the claims below will be better understood by referring to the present detailed description of embodiments of the invention. This description is not intended to limit the scope of claims but instead to provide examples of the invention. Described first is a method of combining customer order information with information about available resources and about product design to produce an efficient production plan for manufacturing substantially two-dimensional elements. Also described is a computerized system that can be used to execute such method. Described additionally is a machine readable storage medium, which can be used as a component of the computerized system to contain instructions that can direct execution of the method.

Figure 4:
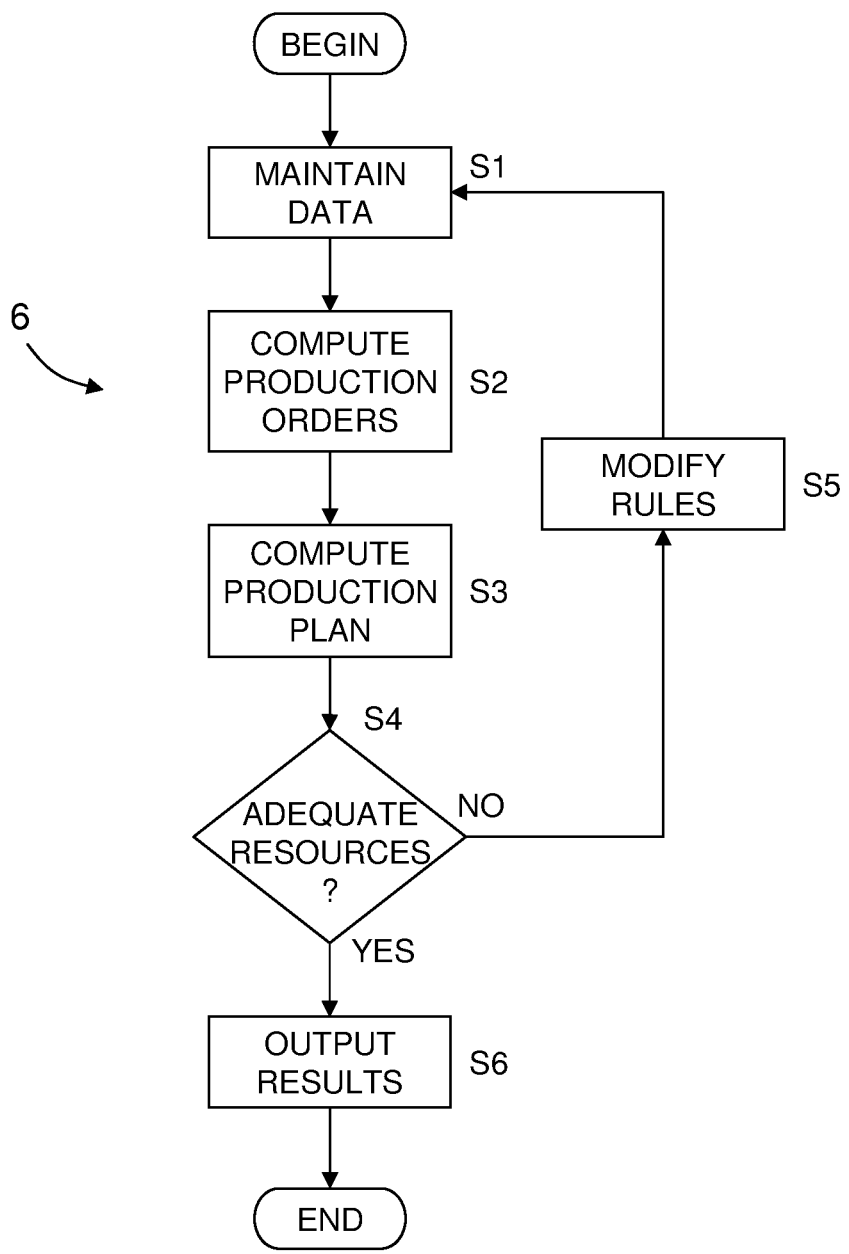
FIG. 4 provides a flow chart used in conjunction with text below to describe an example method embodying the invention.

The first embodiment of the invention that is discussed in detail is a computer-based method of combining customer order information with information about available resources and about product design to produce an efficient production plan for manufacturing substantially two-dimensional elements. The invention is described as follows with reference to the flowchart 6 of FIG. 4.

A computer used in this embodiment receives, produces and stores data needed to implement the various steps of the method. The data include the details of customer orders, product design, manufacturing resources, and manufacturing rules and objectives. The terminology "customer order" is also referred to sometimes as a "job." The term "job" can also refer to a set of customer orders that have been consolidated to be processed together. Thus, data including details of customer orders can be referred to as "job data." As discussed below, jobs can later be merged by the embodiment to improve production efficiencies. The job data include for each ordered job the product to make, its special requirements (for example, customer-specific sizing of a product, specific quality characteristics, or special quantities), the types of materials to use for making that product, the due dates, and other information. The product design data includes—at least a listing of the parts that compose the product and its optional variants/additions, exact geometric definition (shapes and sizes) of each such part (including two- or three-dimensional graphic depictions of the product and parts), manufacturing restrictions for the product and/or any specific part that makes it (such as cutting and assembly restrictions), and material requirements, The resource data in this embodiment include—among others—descriptions of the inventory of raw material and the machines available for cutting the nests. Human resource data, for example, labor costs, may also be included. The rule and objective data specify manufacturing constraints, which may be uncompromising or flexible. Examples of uncompromising rules are "material thicker than 10 mm is not cut by machine A." This rule cannot be changed because of mechanical limitations of the machines. Flexible rules can be changed at management's discretion. Examples of flexible rules include "No more than two jobs are merged," "Send as many as possible jobs to machine A" (because of its higher quality cutting), and "Use material B whenever possible." Examples of objectives (akin to goals) are "Finish as early as possible" and "Use as little material as possible" with the provision that, in the event that these objectives conflict, a solution is selected that best balances the objectives based on the manufactures priorities at any given time. As shown below, the present embodiment (and other embodiments) "transforms" customer orders (jobs) into production orders in an efficient way, effectively bridging the gap of services provided by ERP and CAD utilities, on the production floor.

Two sample manufacturing rules in particular are discussed further below. The first rule is not to cut a nest until a set time before a job's due date (thereby allowing more time for a newer job order to arrive that, when merged with the first job, provides more efficient use of the raw material). The second manufacturing rule sets a required minimum material yield (that is, the total amount of material of a job's panels divided by the area of the raw material used for the panels' nest)

The memory (or "storage") used to store the manufacturing data is generally non-volatile, such a personal computer's hard drive, but the embodiment is not necessarily limited accordingly. Data may be entered via a personal computer's keyboard or through data-transfer from an adjacent system, such as the customer-order management system or the Enterprise Resource Planning (ERP) system, and become available for use while still in a volatile RAM. The data are nonetheless maintained in a memory. (Step S1.)

The next step is to compute, based the resource data and the rule and objective data, production orders for substantially two-dimensional elements for selected jobs to which the job data correspond. (Step S2.) A production order in this embodiment specifies for at least one given job a nest and resources to cut the nest. In some implementations, the resources specified in the production order to cut the nest include at least one unit of material from which to cut the nest and at least one machine to cut the nest. A "unit" of material is a specifically-identified piece of raw material, such as a sheet of material identified by a serial number on a bar code label affixed to the sheet. (In contrast, the term "unit" is not intended to identify a group of material pieces, such as any one of two-foot by three-foot half-inch thick sheets of plywood.) As stated above, the production orders are computed only for "selected" jobs, as opposed to computing them for all jobs. An example of selected jobs is only those jobs which are due in five days or fewer, if a business rule dictates that jobs due after five days will not have production orders computed for them.

A production order is computed by considering multiple factors. In the present embodiment, step S2 considers which of the available machines to use for a given job (for example, the one that uses the least electricity or the one that is fastest), which unit or units of material to use (for example, which roll, sheet, or remnant thereof), and which nest to use for a particular machine and material, as an efficient nest for one machine/material may not be so efficient or even possible to use on another machine/material. The nest may not be possible to use on a different machine if, for example, the nest requires a unit of material that would not fit on that machine. For each job, multiple "tentative" productions orders are considered before a single production order for the job is output. The goal is to select the most efficient production order for the given job. Efficiency of a production order may be judged based on multiple criteria, for example, material yield, execution time, and machine operation costs. Often, these criteria may conflict with one another, requiring the selection process to balance the various criteria against the definition of "most efficient" as defined in the production objectives set in the system. (Note that, although a production order for one job may itself be efficient, executing the production order may require that production orders for other jobs will be less efficient. Thus, subsequent steps of the present method as explained below determine whether the individually-computed production orders from step S2 are desirable for use in an overall production plan.)

Figure 5D:
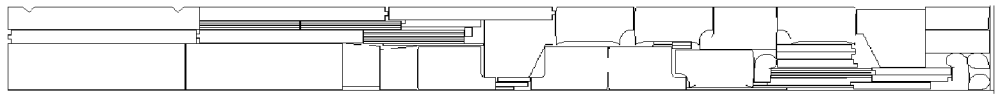
FIG. 5d illustrates a nest on a unit of material that was not previously used for other production orders.

With reference to the table in FIG. 5a, consider the following example scenario of performing part of step S2. For simplicity of explanation, only jobs and material types are considered in this discussion, and the determination of which machine to use is not discussed.

Production Orders are to be determined for eight jobs, the individual jobs being labeled A-G in the first column of the table. Each job is to be cut from material types (or simply "materials," as opposed to specific units of material in inventory) X, Y, or Z, as indicated in the second column. The third column indicates whether the job is due in one, two, three, or nine days. For this example scenario, step S2 is executed by computing production orders for each material X, Y, and Z. Also for this scenario, the manufacturing rules in effect include: (1) nests for jobs and job merges will not be computed, if the job or at least one member of a job merge has a due date that is more than five days away; and (2) a job is fulfilled for material Z only if it is due that day (or if that job is part of a job merge including a job that is due that day).

Specifically, for material X, nests are computed for A, B, C, AB, AC, BC, and ABC, where "AB, AC, BC, and ABC" indicate job merges of individual orders A, B, and C. In other words, for jobs to be cut from the same raw material, production orders are computed for selected jobs individually and for combinations of the jobs merged. For the combinations of jobs merged, the nests may be computed in at least two ways: (1) the elements of the separate jobs can be mixed together as a way to increase material yield; or (2) the elements of separate jobs can be kept separate, that is, be nested back-to-back, which forms what is sometimes referred to as "rolling nests." As discussed above in the Background section, the terminology "job merge" refers to nesting and cutting multiple jobs together. Merging jobs frequently results in better "cover," that is, in more efficient usage of available resources. As an example of separate jobs mixed together for nesting, reference is made to FIG. 5b, which illustrates a nest 7a having groups of elements 7b, 7c, 7d for three separate jobs. As an example of separate jobs kept separate (rolling nests), reference is made to FIG. 5c, which illustrates a single sheet 7e (or flattened roll) having two separate nests 7f and 7g.

For material Y, nests are computed for job D but not for job E or for job merge DE because of the manufacturing rule that restricts computing nests for jobs and job merges, if the job or at least one member of a job merge has a due date that is more than five days away. That is, D is a job that is "selected" for the nest computation, but E and DE are not selected jobs for nest computations. The jobs not processed at this point will be processed later as their due dates approach. At that point, other (new) jobs may be processed with them.

For material Z, nests are computed for F, G and FG. If separate nests F and G provide the better cover than the nest for job merge FG, only F will be cut and G will not be cut that day due to the manufacturing rule of this example permitting fulfillment of a job for material Z only if it is due that day (or if that job is part of a job merge including a job that is due that day).

Figure 5E:
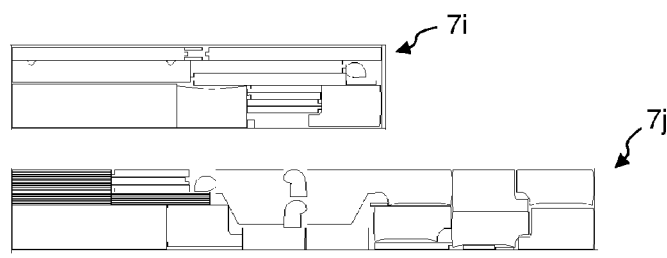
FIG. 5e illustrates a nest for a job distributed on two remnants of units of material that were previously used for other production orders.

In this and in alternate embodiments, step S2 may include (1) computing nests on units of material that were not previously used for other production orders and (2) computing nests on remnants of units of material that was previously partially used for other production orders. The units of materials and the remnant of units of materials may have one or more sizes, and the nests are computed on one or more units of materials and/or remnants of units of material. For one job a nest can be computed assuming the use of one unit of material (for example, a sheet or a roll) whether used or not. As another alternative, another nest for the same job may be computed such that it is really a set of multiple "sub-nests." That is, the nest is computed such that elements of the nest are cut from at least two different units of material. As an example of nests on units of material that were not previously used for other production orders, reference is made to FIG. 5d which illustrates a nest 7h on a single unit of material. As an example of nests on remnants of units of material that were previously used for other production orders, reference is made to FIG. 5e, which illustrates a two remnants 7i and 7j, each having a portion of a nest for a single job.

The next step in the present embodiment is to compute, based on the resource data and the rule and objective data, a production plan for the production orders that were computed in step S2. (Step S3.) Various options exist for maintaining manufacturing rules that provide efficient use of resources. For example, one rule can be to cut all nests on a machine from one particular raw material before cutting a nest from another raw material. This rule may be implemented in light of the fact that a machine cannot cut a nest while it is being set up for a different material. This rule obviates excessive setup time and thus increases efficiency time-wise. Another example rule is to use the cutting machine that is the least expensive to operate. Such rule increases efficiency with respect to machine costs.

Although step S3 is executed to optimize resource consumption, it is nonetheless next determined whether, based on the resource data, the computed production plan would require more resources than are available. (Step S4.) For example, the production plan computed in step S3 might cause one or more production stations (for example, cutting machines or manual cutting tables) to be overloaded. As another example, the production plan computed in step S3 might require excessive quantity of a particular material (that is, more than is available in inventory) and thus not be available in time for production.

If it is determined in step S4 that the computed production plan of step S3 would require more resources than are available, the manufacturing rules are modified in response. (Step S5.) This modification may be referred to as a "rule relaxation" process, whereby, if the initial rules are too "harsh," they are slowly and methodically eased to arrive at a valid solution. For example, if the selected production plan overloads one of the machines (machines being a type of resource), but other similar machines are available, a manufacturing rule that had been to use the machine that was the least expensive to operate can be modified so that the two machines least expensive to operate will be used. As another example, if the selected sequence overloads all machines, the manufacturing rule setting the trade-off between the material yield and the cutting time could be changed in order to speed up the production of some jobs. (For example, the required material yield may be lowered.) The last legal due date for initial job selection could be changed as well. Generally, the rule and objective data can be modified as desired to allow allocation of additional resources, including time. The modification may increase cutting-resource throughput (production rate), even at the expense of material yield or other resources. Alternatively, the modification may decrease cutting-resource throughput to increase material yield or efficiency of other resource use.

The modification of the manufacturing rules in step S5 affects how the rule data are maintained, and the process flow returns to step S1. Steps S2 and S3 are performed again, and then it is determined again in step S4 whether the computed production plan would require more resources than are available.

The embodiment is described as if, as long as the determination at step S4 is that more resources are required than are available, a cycle of steps S1 through S5 continues indefinitely. However, each S1-S5 cycle decreases the resource deficit. In an alternative implementation, another step is added in which some jobs are intentionally delayed beyond their due dates in order to compute a production plan that will have adequate resources. In other alternate implementations, the S1-S5 cycle can be discontinued upon receipt of an instruction to stop. The instruction can be internally or externally generated.

An example of an internal instruction occurs in the context of the method running in an automated fashion on a personal computer or computer server, and a preset maximum run time is in place for running the method; an instruction to discontinue the S1-S5 cycle is generated, if the preset maximum run time is exceeded. The routine can be set to provide the most recently computed production plan and/or to provide a message that the maximum run time has been exceeded.

An example of an external instruction to discontinue the S1-S5 cycle could originate from a human operator as a result of a new job needing to be added at that time or an old job being changed or canceled. A notification of a significant change in manufacturing resources (such as a machine failure), whether an automated or human-generated notification, is another example of an instruction to discontinue the cycle. Often when a cycle is terminated, the currently achieved cycle process results become totally or partially useless, and a modified run begins.

If it is determined instead in step S4 that there are adequate resources for using the production plan computed in step S3, the process flows to step S6. In this step, the computed production plan is outputted. For this embodiment, the output includes the production orders, that is, which nests to cut, on which resources to use to cut them (for example, with which rolls/sheets of raw material and/or on which machines), and the output also indicates the scheduling for filling the production orders. The output for example can take the form of an image on a display of a personal computer or a paper printout, or the output can be electronic data sent to a remote location of a manufacturing plant, or machine-specific instructions outlining the cutting-sequences of the parts (such as CNC Machine g-codes). An alternative embodiment of the invention can be regarded including the physical step, executed by humans and/or machines, of cutting the nests in accordance with the production plan that is outputted in step S6.

The process flow then ends. As is shown above, this method combines information about customer orders, available manufacturing-resources, and product-design information to generate production orders in an efficient way, thereby bridging the gaps between ERP (or similar systems), CAD systems and the production floor.

Another embodiment of the present invention is a computerized system for combining customer order information with information about available resources and about product design to produce an efficient production plan for manufacturing substantially two-dimensional elements. Such embodiment will be discussed with reference to the block diagram in FIG. 6.

The computerized system 10 includes a processing unit 12, a storage unit 14, an input interface 16, and an output interface 18. In this embodiment, these components are part of a personal computer 20, and they form a computing module 22. The components instead may be part of a workstation, PDA, or smart phone as non-limiting alternative example embodiments. As a further alternative, a computing module may be part of a machine that cuts nests of substantially two-dimensional elements.

Figure 6:
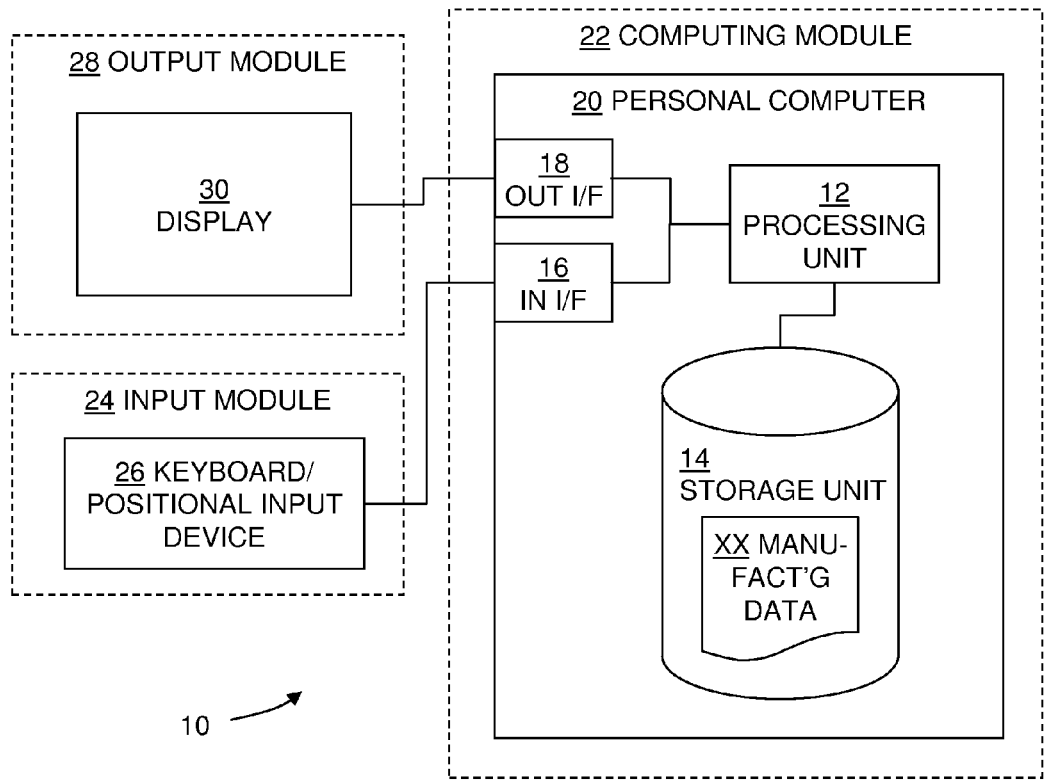
FIG. 6 presents a block diagram of a computerized system according to another embodiment of the invention.

The input interface 16 of the computerized system 10 is configured to receive manufacturing data that include job data, product design data, resource data, and rule and objective data, and that manufacturing data is stored in the storage unit 14. The input interface 16 may for example include a USB socket of the personal computer 20. The input interface 16 may alternatively receive input from an entry device, such as a keyboard, and/or adjacent computer systems, such as Enterprise Resource Planning (ERP), and computer aided design (CAD) software. As shown in FIG. 6, the computerized system 10 includes an input module 24 that is configured to transmit to the input interface 16 a user's input as the manufacturing data. For that purpose, the input module 24 includes a keyboard and/or a positional input device 26, which may connect to the personal computer 20 through the USB socket. The positional input device may be a mouse, a trackball, or a touchpad as non-limiting examples. In addition to a keyboard or positional input device, the input module 24 may include any other equivalent means for transmitting a user's input to the input interface 16.

The output interface 18 of the computerized system 10 is configured to transmit signals that indicate a cutting sequence and resources to use for cutting nests as determined by the computerized system 10. The output interface 18 may for example include a VGA connector of the personal computer 20. As shown in FIG. 6, the computerized system 10 includes an output module 28 that is configured to receive the signals from the output interface 18 to indicate the output variable to the user. For that purpose, the output module 28 includes a display 30 for the user to visually observe the output variable. The display 30 may connect to the personal computer 20 through the VGA connector. In place of or in addition to the display 30, the output module may include any other equivalent means for receiving the signals from the output interface 18. For example, the use of an output device that is designed for visually-impaired users is within the scope of the invention. Also, the output device may include a printer. In alternate embodiments, the output interface 18 may send signals to machinery operative to cut nests of substantially two-dimensional elements. Examples of such machinery include wood-cutting routers, foam or fabric-cutting machines, and metal-cutting machines of various technologies, all of which can receive signals that indicate cutting instructions.

As shown in FIG. 6, the processing unit 12 is operatively connected to the input interface 16, the output interface 18, and the storage unit 14. The processing unit 12 executes instructions contained in the storage unit 14. The instructions, when executed, cause the processing unit 12 to: (1) compute, based the resource data and the rule and objective data, production orders for substantially two-dimensional elements for selected jobs associated with the job data, whereby a production order specifies for at least one given job one or more nests and resources to cut the one or more nests; (2) compute, based on the resource data and the rule and objective data, a production plan for the production orders, whereby the production plan schedules execution of the production orders; (3) determine, based on the resource data, whether the computed production plan requires more resources than are available; and (4) modify the rule data maintained in the storage unit 14 and repeat the preceding instructions, if more resources than available are determined to be required.

As non-limiting examples, the processing unit 12 of system 10 may include an Intel Pentium Processor E5400, an Intel Xeon 5130 CPU, or any other equivalent means for processing (executing) instructions contained in the storage unit 14. Also as non-limiting examples, the storage unit 14 may be SATA hard drive, a flash memory SSD, or any other equivalent means for storing instructions that when executed by the processing unit 12 cause the processing unit 12 to function as described above.

The embodiment of FIG. 6 may be modified to allow a user to interact with a computing module through a network. As non-limiting examples, the network may be a local area network (LAN) within an office environment or alternatively the Internet. An alternative embodiment may implement a "hosted" architecture for the computing module, whereby the algorithmic calculations are done in a remote data-center (server farm) accessible over the network/Internet. Another alternative embodiment may implement a cloud computing configuration for the computing module. Thus, a user may interact with the computing module using a Microsoft® Windows-based utility or a web browser, as non-limiting examples. Examples of such modified systems are shown with reference to the block diagram in FIG. 7.

Figure 1:
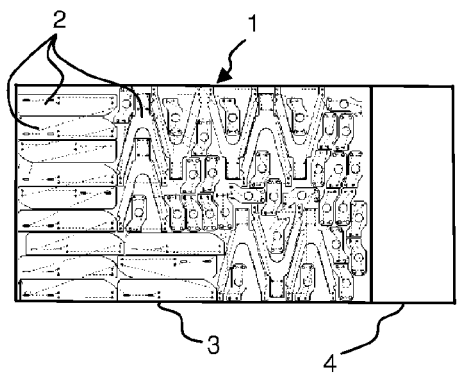
FIG. 1 illustrates, as background art, an example nest for a single-unit of metal panels.
Figure 2:
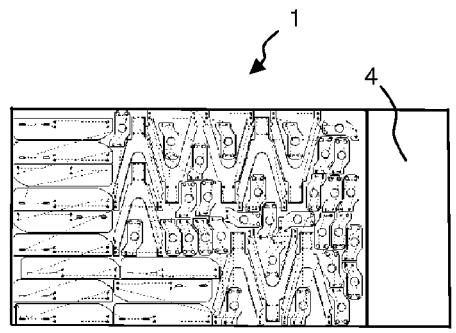
FIG. 2 illustrates, again as background art, a set of nests for four job orders of the type illustrated in FIG. 1 by using the same single-unit nest four times.
Figure 3:
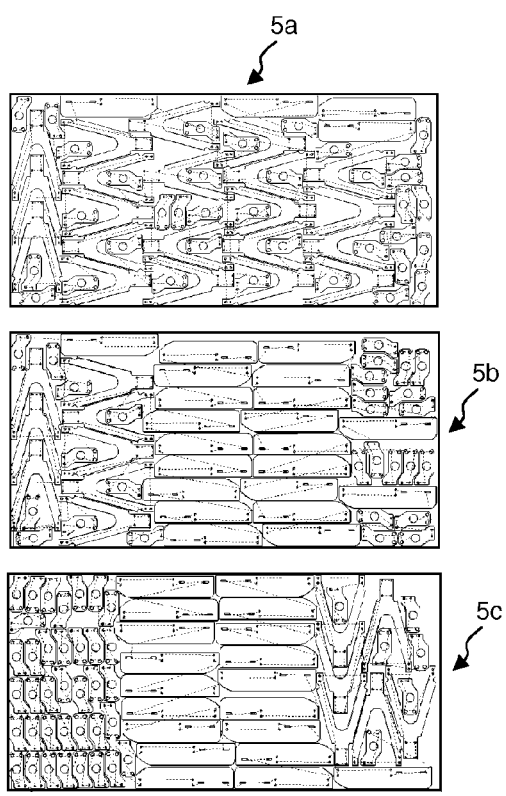
FIG. 3 illustrates, further as background art, a savings of raw material when the four jobs of FIG. 2 are merged into a single nest.
Figure 7:
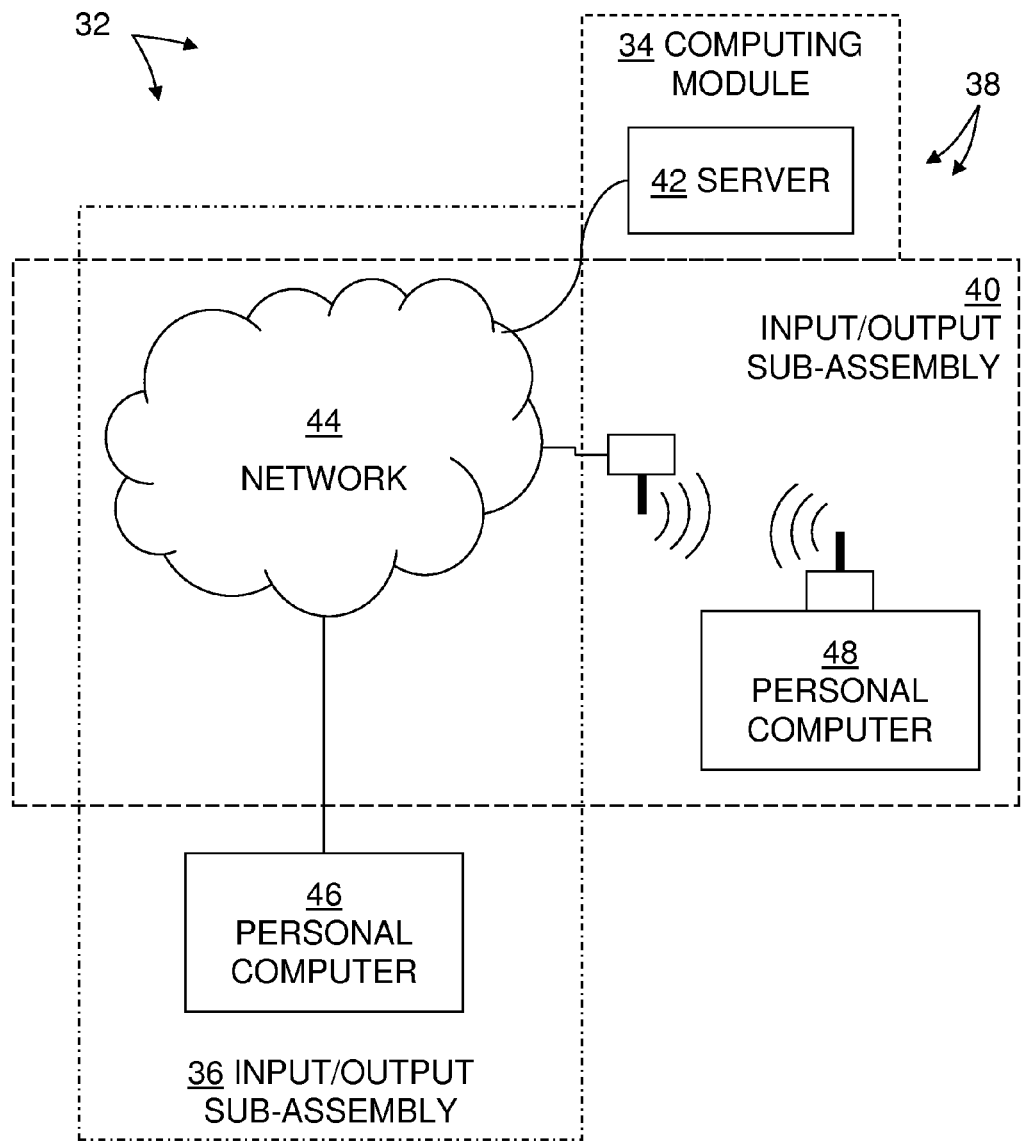
FIG. 7 presents a block diagram of an embodiment of a computerized system implementing a network.

One computerized system 32 of FIG. 7 includes a computing module 34 and an input/output sub-assembly 36, and another computerized system 38 includes the computing module 34 and an input/output sub-assembly 40. The computing module 34 of FIG. 7 is analogous to the computing module 22 of FIG. 6, with the differences being apparent from the discussion herein. For example, the personal computer 20 of FIG. 6 is replaced by a server 42, although the relevant internal components are basically or very nearly the same. Also, instead of using USB sockets or VGA connectors as the input interface 16 and the output interface 18, respectively, the server 42 may use 8P8C modular Ethernet sockets (sometimes referred to as "RJ45" sockets) for both input and output interfaces to a network 44. As is apparent for the embodiments of both FIGS. 3 and 4, the input interface 16 can be a USB socket, an 8P8C modular Ethernet socket, or any other equivalent means for receiving signals that indicate values of the input variable(s). Also, the output interface 18 can be a VGA connector, an 8P8C modular Ethernet connector, or any other equivalent means for transmitting signals that indicate the output variable.

As shown in FIG. 7, the network 44 is part of both the input/output sub-assembly 36 and the input/output sub-assembly 40. Both input/output sub-assemblies 36, 40 are configured to transmit through the network 44 to the input interface of the server 42 user inputs as the signals indicating the values of the input variable(s). Both input/output sub-assemblies 36, 40 are also configured to receive signals from the output interface of the server 42 through the network to indicate the output variable to the user. Users may interact with the server 42 using a personal computer 46 of the computerized system 32 or using a personal computer 48 of the computerized system 38. The personal computer 46 communicates with the network 44 via a wired connection, and the personal computer 48 communicates with the network 44 via a wireless connection. Besides input/output subassemblies 36, 40 using personal computers with wired and wireless connections to the network 44, the input/output subassembly can instead be any other equivalent means for transmitting/receiving signals through/from the network 44.

The invention may also be embodied as a storage medium (or "memory"), such as the storage unit 14 in the system 10 of FIG. 6, that contains instructions associated with combining customer order information with information about available resources and about product design to produce an efficient production plan for manufacturing substantially two-dimensional elements. The instructions, when executed, perform the method associated with the flowchart 6 provided in FIG. 4.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

We claim:

1. A computer-based method of combining customer order information with information about available resources and about product design to produce an efficient production plan for manufacturing substantially two-dimensional elements, the method comprising the following steps:

maintaining manufacturing data in a memory, the data including job data, product design data, resource data, and rule and objective data;

computing, based on the product design data, the resource data, and the rule and objective data, production orders for substantially two-dimensional elements for selected jobs associated with the job data, whereby a production order specifies for at least one given job one or more nests and resources to cut the one or more nests;

computing, based on the product design data, the resource data, and the rule and objective data, a production plan for the production orders, whereby the production plan schedules execution of the production orders;

determining, based on the resource data, whether the production plan requires more resources than are available; and modifying the rule and objective data maintained in the memory and repeating the maintaining, computing production orders, computing production plan, and determining steps, if more resources than available are determined to be required;

wherein:

(1) the product design data include at least one of:
a. a listing of parts that compose a product,
b. geometric definitions of each of the parts,
c. manufacturing restrictions for a product and/or a specific part that makes the product, and
d. material requirements;

(2) the resource data include descriptions of inventory of raw material and/or machines available for cutting the nests of the elements; and (3) the rule and objective data specify manufacturing constraints.

2. The method of claim 1, wherein the resources specified in the production order to cut the nest include at least one unit of material from which to cut the nest and/or at least one production station to use to cut the nest.

3. The method of claim 1, wherein, for jobs to be cut from the same raw material, nests are computed for selected jobs individually and for combinations of merged jobs, wherein for the combinations of jobs merged, the nests may be computed so that elements of separate jobs are mixed together or are separated.

4. The method of claim 1, wherein the step of computing production orders includes (1) computing nests on units of material that were not previously used for nests and (2) computing nests on remnants of units of material that was previously partially used for nests, wherein the units of materials and the remnant of units of materials have one or more sizes and the nests are computed on one or more units of materials and/or remnants of units of material.

5. The method of claim 1, wherein the step of computing production orders includes computing a nest for one job such that elements of the nest are cut from at least two different units of material.

6. The method of claim 1, wherein, for the step of determining whether the production plan requires more resources than are available, the determination is based on resource data that enable a determination of whether the production plan would overload one or more production stations.

7. The method of claim 1, wherein, for the step of determining whether the production plan requires more resources than are available, the determination is based on resource data that enable a determination of whether the production plan would require an excessive quantity of a particular material that would be not available in time for production.

8. The method of claim 6, wherein, if the production plan is determined to require more resources than are available to complete the plan within the defined production rules, then the rule and objective data are modified to allow allocation of additional resources and/or to use additional time that is not available under the initial rule and objective data.

9. The method of claim 6, wherein, if the production plan is determined to overload the one or more cutting machines and no additional cutting machine is available, the rule and objective data are modified to increase cutting-resource throughput.

10. The method of claim 1, wherein the modifying step is also repeated, if more resources than available are again determined to be required, and a cycle of the steps continues until either (1) it is determined that the available resources suffice for the computed production plan or (2) an instruction is received to discontinue the cycle.

11. The method of claim 1 further comprising:
cutting the nests in accordance with the outputted production plan.

12. A computerized system for combining customer order information with information about available resources and about product design to produce an efficient production plan for manufacturing substantially two-dimensional elements, the system comprising:

an input interface configured to receive manufacturing data that include job data, product design data, resource data, and rule and objective data;

a processing unit operatively connected to the input interface; a storage unit operatively connected to the processing unit to store the manufacturing data, the storage unit also containing instructions that when executed by the processing unit cause the processing unit to: (1) compute, based on the product design data, the resource data, and the rule and objective data, production orders for substantially two-dimensional elements for selected jobs associated with the job data, whereby a production order specifies for at least one given job one or more nests and resources to cut the one or more nests; (2) compute, based on the product design data, the resource data, and the rule and objective data, a production plan for the production orders, whereby the production plan schedules execution of the production orders; (3) determine, based on the resource data, whether the production plan requires more resources than are available; and (4) modify the rule and objective data maintained in the storage unit and repeat the preceding instructions, if more resources than available are determined to be required; and an output interface operatively connected to the processing unit, the output interface configured to transmit signals indicative of the computed production plan;

wherein:

(1) the product design data include at least one of:
a. a listing of parts that compose a product,
b. geometric definitions of each of the parts,
c. manufacturing restrictions for a product and/or a specific part that makes the product, and
d. material requirements;
(2) the resource data include descriptions of inventory of raw material and/or machines available for cutting the nests of the elements; and
(3) the rule and objective data specify manufacturing constraints.

13. The system of claim 12, wherein the resources specified in the production order to cut the nest include at least one unit of material from which to cut the nest and/or at least one production station to use to cut the nest.

14. The system of claim 12 further comprising:
an input module configured to transmit to the input interface a user's input as the manufacturing data; and
an output module configured to receive the signals from the output interface to indicate the production plan.

15. The system of claim 12 further comprising:
an input/output sub-assembly that includes a network;
wherein the input/output sub-assembly is configured to transmit to the input interface a user's input as the manufacturing data, the transmission being through the network; and
wherein the input/output sub-assembly is also configured to receive signals from the output interface through the network to indicate to the user the production plan.

16. The system of claim 12 further comprising:
machinery operative to cut the nests in accordance with the signals that are indicative of computed production plan.

17. A computerized system for combining customer order information with information about available resources and about product design to produce an efficient production plan for manufacturing substantially two-dimensional elements, the system comprising:
an input interface means for receiving signals that indicate manufacturing data that include job data, product design data, resource data, and rule and objective data;
a means for processing operatively connected to the input interface means; a means for storing the manufacturing data and instructions, the instructions when executed by the processing means cause the processing means to: (1) compute, based on the product design data, the resource data, and the rule and objective data, production orders for substantially two-dimensional elements for selected jobs associated with the job data, whereby a production order specifies for at least one given job one or more nests and resources for cutting the one or more nests; (2) compute, based on the product design data, the resource data, and the rule and objective data, a production plan for the production orders, whereby the production plan schedules execution of the production orders; (3) determine, based on the resource data, whether the production plan requires more resources than are available; and (4) modify the rule and objective data maintained in the means for storing and repeat the preceding instructions, if more resources than available are determined to be required; and an output interface means for transmitting signals that indicate the computed production plan;

wherein:

(1) the product design data include at least one of:
a. a listing of parts that compose a product,
b. geometric definitions of each of the parts,
c. manufacturing restrictions for a product and/or a specific part that makes the product, and
d. material requirements;
(2) the resource data include descriptions of inventory of raw material and/or machines available for cutting the nests of the elements; and
(3) the rule and objective data specify manufacturing constraints.

18. The computerized system of claim 17 further comprising:
a means for transmitting to the input interface means a user's input as the signals that indicate the manufacturing data; and
a means for receiving the signals from the output interface means to indicate the computed production plan.

19. The computerized system of claim 17 further comprising:
an input/output means for: (1) transmitting through a network to the input interface means a user's input as the signals that indicate the manufacturing data; and (2) receiving the signals through the network from the output interface means to indicate the production plan to the user.

20. The computerized system of claim 17 further comprising:
machining means for cutting the nests in accordance with the signals that are transmitted from the output interface means.

21. A non-transitory machine readable storage medium containing instructions associated with combining customer order information with information about available resources and about product design to produce an efficient production plan for manufacturing substantially two-dimensional elements, the instructions when executed causing the following:
maintaining manufacturing data in a memory, the data including job data, product design data, resource data, and rule and objective data;
computing, based on the product design data, the resource data, and the rule and objective data, production orders for substantially two-dimensional elements for selected jobs associated with the job data, whereby a production order specifies for at least one given job one or more nests and resources to cut the one or more nests;

computing, based on the product design data, the resource data, and the rule and objective data, a production plan for the production orders, whereby the production plan schedules execution of the production order;

determining, based on the resource data, whether the production plan requires more resources than are available; and modifying the rule and objective data maintained in the memory and repeating the preceding instructions, if more resources than available are determined to be required.

22. The non-transitory storage medium of claim 21, wherein the resources specified in the production order to cut the nest include at least one unit of material from which to cut the nest and/or at least one machine to cut the nest.

23. The non-transitory storage medium of claim 21, wherein, for jobs to be cut from the same raw material, nests are computed for selected jobs individually and for combinations of merged jobs, wherein for the combinations of jobs merged, the nests may be computed so that elements of separate jobs are mixed together or are separated.

24. The non-transitory storage medium of claim 21, wherein the computing of production orders for selected jobs includes (1) computing nests on units of material that were not previously used for nests and (2) computing nests on remnants of units of material that were previously used for nests, wherein the units of materials and the remnant of units of materials have one or more sizes and the nests are computed on one or more units of materials and/or remnants of units of material.

25. The non-transitory storage medium of claim 21, wherein the computing of production orders includes computing a nest for one job such that elements of the nest are cut from at least two different units of material.

26. The non-transitory storage medium of claim 21, wherein, for the instruction of determining whether the production plan requires more resources than are available, the determination is based on resource data that enable a determination of whether the production plan would overload one or more production stations.

27. The non-transitory storage medium of claim 21, wherein, for the instruction of determining whether the production plan requires more resources than are available, the determination is based on resource data that enable a determination of whether the production plan would require an excessive quantity of a particular material.

28. The non-transitory storage medium of claim 26, wherein, if the production plan is determined to overload the one or more production stations and at least one additional production station is available, the rule and objective data are modified to allow the at least one additional production station to be used for cutting nests.

29. The non-transitory storage medium of claim 26, wherein, if the production plan is determined to overload the one or more production stations and no additional production station is available, the rule and objective data are modified to increase cutting-resource throughput.

30. The non-transitory storage medium of claim 21, wherein the modifying instruction is also repeated, if more resources than available are again determined to be required, and a cycle of the instructions continues until either (1) it is determined that the available resources suffice for the production plan or (2) an instruction is received to discontinue the cycle.

* * * * *